(12) United States Patent
Kram et al.

(10) Patent No.: US 6,915,211 B2
(45) Date of Patent: Jul. 5, 2005

(54) GIS BASED REAL-TIME MONITORING AND REPORTING SYSTEM

(75) Inventors: Mark Kram, Santa Barbara, CA (US); Sanya Sirivithayapakorn, Goleta, CA (US); Ralph Edward Beighley, II, Santa Barbara, CA (US)

(73) Assignee: Groundswell Technologies, Inc., Santa Barbara, CA (US)

( * ) Notice: Subject to any disclaimer, the term of this patent is extended or adjusted under 35 U.S.C. 154(b) by 3 days.

(21) Appl. No.: 10/407,926

(22) Filed: Apr. 4, 2003

(65) Prior Publication Data

US 2003/0216949 A1 Nov. 20, 2003

Related U.S. Application Data

(60) Provisional application No. 60/370,304, filed on Apr. 5, 2002, and provisional application No. 60/424,641, filed on Nov. 6, 2002.

(51) Int. Cl.[7] ............................................. G06F 19/00
(52) U.S. Cl. ...................................................... 702/5
(58) Field of Search .............................. 702/2, 3, 5, 17, 702/6, 12, 13, 14; 701/50

(56) References Cited

U.S. PATENT DOCUMENTS

| | | | | |
|---|---|---|---|---|
| 5,321,613 A | * | 6/1994 | Porter et al. | 702/1 |
| 5,470,233 A | * | 11/1995 | Fruchterman et al. | 434/112 |
| 5,666,648 A | * | 9/1997 | Stuart | 370/321 |
| 5,684,476 A | * | 11/1997 | Anderson | 340/988 |
| 5,689,418 A | * | 11/1997 | Monson | 702/2 |
| 5,699,244 A | * | 12/1997 | Clark et al. | 702/2 |
| 5,771,169 A | * | 6/1998 | Wendte | 702/5 |
| 5,808,916 A | * | 9/1998 | Orr et al. | 703/6 |
| 5,809,440 A | * | 9/1998 | Beck et al. | 701/50 |
| 6,023,223 A | * | 2/2000 | Baxter, Jr. | 340/531 |
| 6,084,510 A | * | 7/2000 | Lemelson et al. | 340/539.13 |
| 6,331,825 B1 | * | 12/2001 | Ladner et al. | 340/988 |
| 6,339,745 B1 | * | 1/2002 | Novik | 701/208 |
| 6,360,172 B1 | * | 3/2002 | Burfeind et al. | 702/2 |
| 6,429,812 B1 | * | 8/2002 | Hoffberg | 342/357.1 |
| 6,542,825 B2 | * | 4/2003 | Jones et al. | 702/3 |
| 6,553,299 B1 | * | 4/2003 | Keller et al. | 701/50 |
| 6,646,559 B2 | * | 11/2003 | Smith | 340/601 |
| 6,720,920 | * | 4/2004 | Breed et al. | 342/386 |
| 6,753,784 | * | 6/2004 | Sznaider et al. | 340/601 |

* cited by examiner

Primary Examiner—Donald McElheny, Jr.
(74) Attorney, Agent, or Firm—Felix L. Fischer

(57) ABSTRACT

A monitoring and reporting system employing field sensor packages with telemetry to a processing system having input software creating cardinal matrices for the sensor data and conversion elements for compatibility with a geographical information system (GIS) to produce real-time generate geostatistically rendered contour diagrams that display the spatial and temporal distribution of environmental parameters of interest.

20 Claims, 5 Drawing Sheets

GIS BASED REAL-TIME MONITORING AND REPORTING SYSTEM

CROSS-REFERENCE TO RELATED APPLICATIONS

This application claims priority of Provisional Application Ser. No. 60/370,304 entitled "Integrated Sensor System" filed on Apr. 5, 2002 and Provisional Application Ser. No. 60/424,641 entitled "Automation Software for GIS Based Real-Time Monitoring and Reporting System" filed on Nov. 6, 2002, the disclosures of which are incorporated by reference as though fully set forth.

NOTICE OF RETENTION OF COPYRIGHT

Certain software programs or routines disclosed in this application are subject to copyright protection and all rights thereto are specifically reserved. No dedication to the public of those copyrights is intended or made by such disclosure in this specification.

BACKGROUND OF THE INVENTION

1. Field of the Invention

This invention relates generally to the field of automated systems for monitoring and detecting the presence of contaminant materials, indicator parameters, and measurements related to fate and transport in order to provide rapid decisions making and warn of environmental hazards and, more particularly, to a geographical information system (GIS) based automated software (GBAS) system, which converts real-time sensor information from sensor data transmission terminals into real-time sensor data and site map representations.

2. Description of the Related Art

Underground storage tanks are used to store hazardous substances and petroleum products. If a leak occurs, these materials can enter the subsurface and contaminate ground water resources, requiring expensive assessment and remediation efforts. It is estimated that a significant proportion of the nearly five million tanks in the United States are leaking harmful products into the environment. To ameliorate this problem, the Environmental Protection Agency (the "EPA") has recently promulgated regulations which require that any leakage exceeding a rate of 0.05 gallons per hour be detected and contained. Although many releases have no known remedy, federal law requires monitoring of all toxic chemicals in our soil, water, and air. Current estimates for monitoring the thousands of contaminated sites are projected to exceed $60 billion over the next ten years. At present, costs for monitoring a typical toxic release site ranges from $15000 to over $200,000 per year using conventional techniques. Several thousand contaminated ground water sites are currently being monitored by the Department of Defense and Department of Energy, typically requiring hundreds of millions of dollars per year. Approximately 50–80% of the expenses go towards sampling, laboratory analyses, and reporting. When compared to conventional monitoring approaches, the present invention can save up to 70% of the overall monitoring budget by reducing sampling, analytical, and reporting requirements for customers using our systems. There are over 500 Southern California contaminated sites currently requiring ground water monitoring.

Methods for detecting leaks in storage tanks are well known in the prior art, however there is still a need for a reliable and economical method and apparatus for automated leak detection and for processing real-time sensor data in a GIS in a manner which allows for rapid decision making and reporting the spatial distribution of parameters of concern. Some prior art systems are basically data dumps (via computer port into a spreadsheet) wherein the data needs to be plotted at a later date. The prior art also includes relatively comprehensive alarm systems for tank leaks with customized software. However, there is nothing in the prior art integrating the data into a comprehensive database structure aimed at tracking trends and making decisions.

It is, therefore, desirable to have a system such as that provided by the present invention that can be applied to sensors placed in surface water bodies and air volumes to monitor the breakthrough and distribution of chemicals and biological materials of concern as well as parameters controlling migration pathway, rate and flux. Furthermore, it is desirable to have a system as provided in the present invention that can be applied to agricultural scenarios for monitoring and optimization of growing conditions based on the distribution of critical parameters.

SUMMARY OF THE INVENTION

The present invention is a geographical information system (GIS) based automated software (GBAS) system, which converts real-time sensor information from sensor data transmission terminals into real-time sensor data and site map representations. Remote monitoring systems of remote sensor bundles provide data for the system. Sensor data is processed to automatically generate report-quality graphical and electronic output, allowing for rapid decision-making capabilities.

The invention allows for real-time visualization of problem areas such as toxic spills, incoming chemical warfare agents, changes in water hydraulic control barriers, and security breaches. The GBAS components automate the data processing and presentation steps utilizing available GIS functions and geo-statistical interpolation algorithms. The GBAS collects data, spatially maps the information as point data (i.e., data values corresponding to sensor locations), interpolates the point data to generate continuous data surfaces between points (i.e., geo-statistical interpolations such as inverse distance squared or kriging), and generates graphical representations automatically (once the system has been installed) using an off-site computer system.

Data can be displayed as layers for map algebra and allow for detailed spatial analyses such as detecting trends in a given time series, evaluating averages over a given time period, monitoring time lapse images for a given time step, and for determining dependent variables in multivariate interactions. In addition, video clips for animation are imbedded into electronic formats for generating presentations and reports. This novel system allows for significant cost-savings, more comprehensive data sets, more flexibility in data management and presentation, removes the need for manual data entry, and reduces the potential for human and ecological toxic exposure.

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

Figure 1:
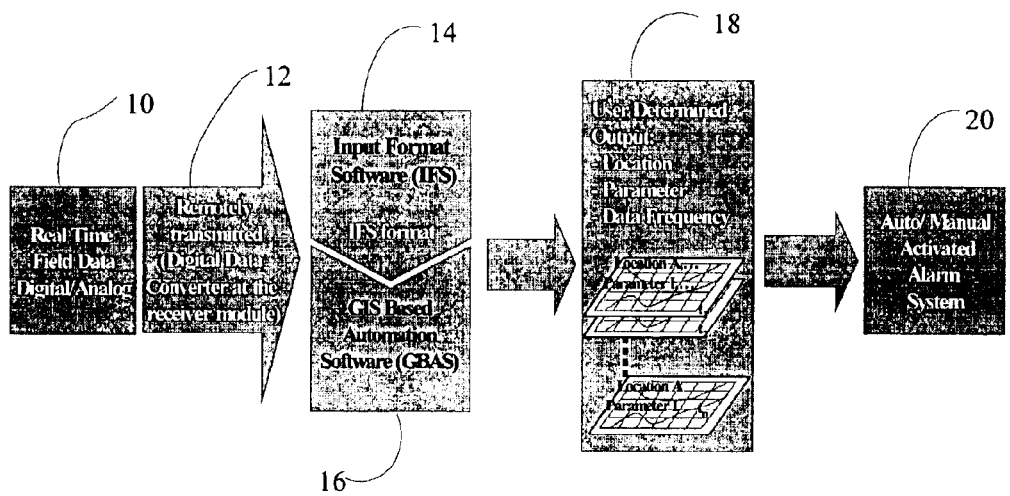
FIG. 1 is a flow schematic of the elements of a system employing the present invention.

Referring to the drawings beginning with FIG. 1, the invention is embodied in a system employing real-time field data sensors 10 connected for remote transmission 12 to provide data to two software elements; a sensor data input formatting system 14 and software code imbedded into a standard geographical information system (GIS) 16. The software elements are employed to process the real-time sensor data and yield site map representations 18. The software uses statistical rendering to read data from each sensor location at a specific time, in real-time, with storage for report output. The benefits of the system are substantial in that one can convert point data to GIS surfaces, allowing for many types of spatial analyses, such as queries with other surfaces and map calculations among others, without the need for manual data entry. An alarm system 20 can be activated automatically or manually based on the interpreted data.

A system incorporating the present invention allows for automated real-time processing of sensor data to generate geostatistically rendered contour diagrams that display the spatial and temporal distribution of environmental parameters of interest. Since the data is processed through a GIS, the entire suite of data mining capabilities becomes available for multivariate analyses. For many types of "field thematic" data (where a value exists at every location), contouring via statistical interpolation is required to determine critical environmental factors such as distribution of contaminant concentration, distribution of geochemical redox zones, and direction of ground water flow. Furthermore, hydraulic containment of contaminated plumes (e.g., physical barriers and pumping systems), requires continuous monitoring to ensure that drinking water resources are protected.

Figure 2:
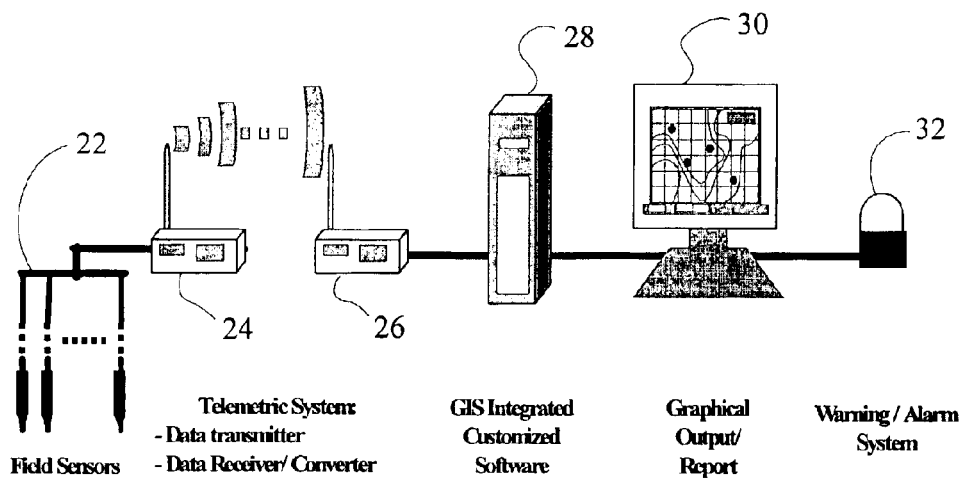
FIG. 2 is a block diagram of the various hardware elements of one embodiment of a system according to the present invention.

FIG. 2 shows the components of one embodiment of the system. A sensor pack 22 contains multiple sensors having various detection and monitoring functions. In an exemplary embodiment of the present invention for a ground water or surface water monitoring application, the sensors are dissolved oxygen, conductivity, temperature, pH, ORP, salinity, water level, nitrate, chloride, ammonium, ammonia, turbidity, etc. For this embodiment, a sensor pack identified as a Multi-Parameter (MP) Troll 9000 with RE485 Network produced by In-Situ is employed. A telemetry system having a transmitter 24 is connected to the sensors for transmission of data to a receiver 26. Transmitter and receiver systems such as In-Situ's Enhanced Telemetry System (ETS) are anticipated for certain embodiments of systems according to the present invention. The receiver is connected to a customer monitoring system such as a workstation 28 or laptop computer. A display 30 is employed to present the graphical data provided by the system and an alarm 32 is incorporated for notification of out of compliance data parameters.

Figure 3:
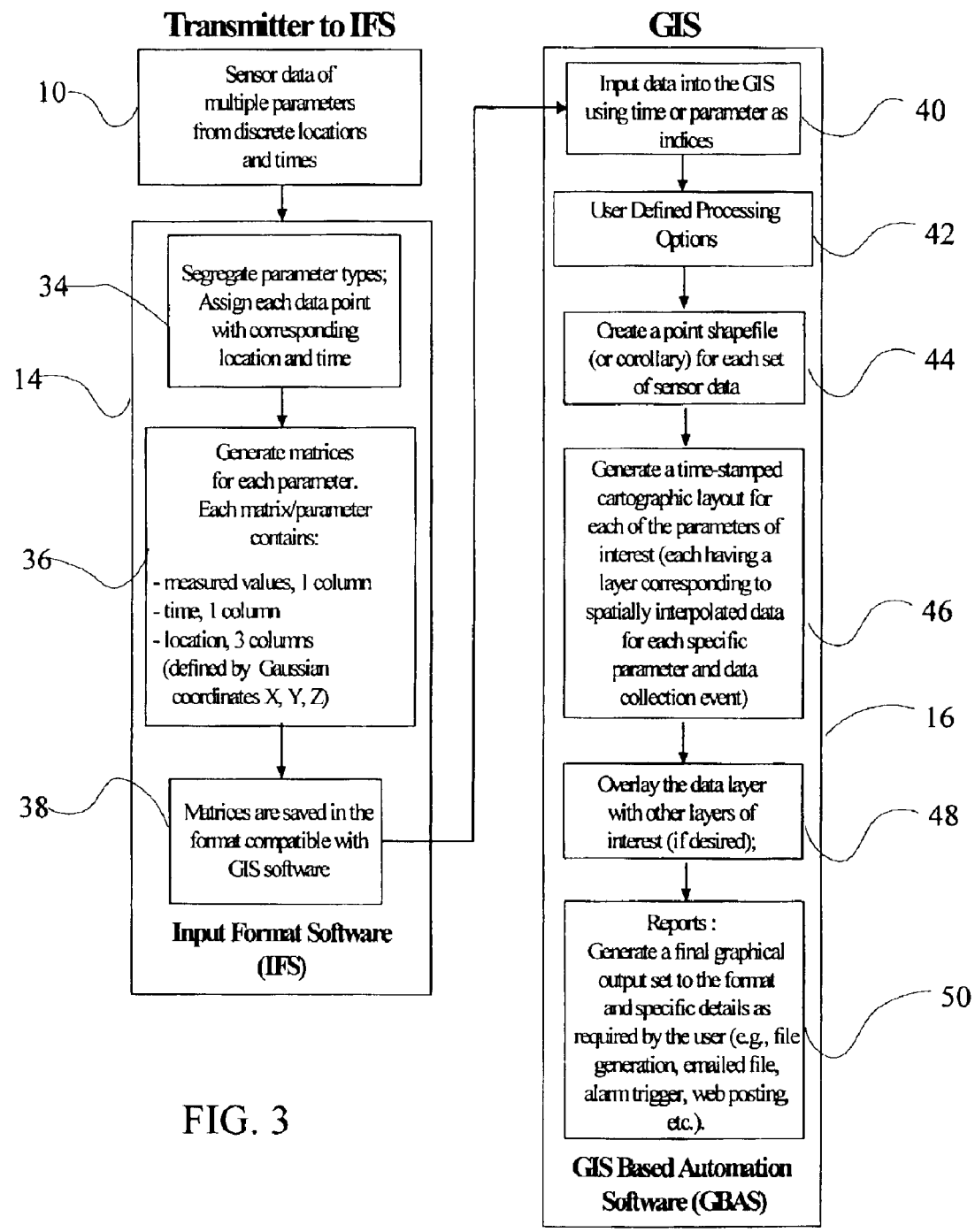
FIG. 3 is a flow diagram of the control functions and software flow for a generalized system according to the present invention.

FIG. 3 shows an Input Format Software (IFS) package 14 and a GIS Based Automation Software (GBAS) system 16.

At discrete time intervals (e.g., 15-minutes), the IFS receives sensor data for multiple parameters from discrete locations. An input processing engine 34 assigns the incoming sensor data with its corresponding location (X,Y,Z). A data matrix generator 36 places the spatially referenced data for each individual parameter into a standard matrix format recognizable to the GIS. As will be described in greater detail subsequently for an exemplary embodiment, the sensor location is defined in a three column Gaussian format (X,Y,Z), time is in the next column, and the remaining column contains a given parameter value. Thus, the matrix generator builds an array of spatially referenced data tables, with each table corresponding to a given parameter type and time, that are used by the GBAS. The matrices generated are saved in a GIS compatible format in storage 38.

The second software component, GBAS, integrates the data into a GIS system and creates the output reports of the system. A data transfer routine 40 receives the data matrices from the IFS using time or another selected parameter as indices. The data is processed according to a user defined processing options trigger 42 which employs a user defined frequency (e.g. quarterly), a parameter driven frequency (e.g. climatic), time series plotting (e.g. trend assessment) or automated reporting (e.g. regulatory defined interval). A file generator 44 creates a point shapefile (or corollary) for each matrix, unique in time and parameter type, from the matrix generator which is then provided to a cartographic layout engine 46 which creates a time-stamped cartographic layout for each of the parameters of interest, predefined by the user, in a layer corresponding to spatially interpolated data for each specific parameter and data collection event. An overlay generator 48 creates overlays of pre-selected layers for presentation and a report generator 50 provides a final graphical output set to the format predetermined by the user. The data can be stored as a file, e-mailed or web posted through an automated port or monitored as an alarm trigger.

Figure 4:
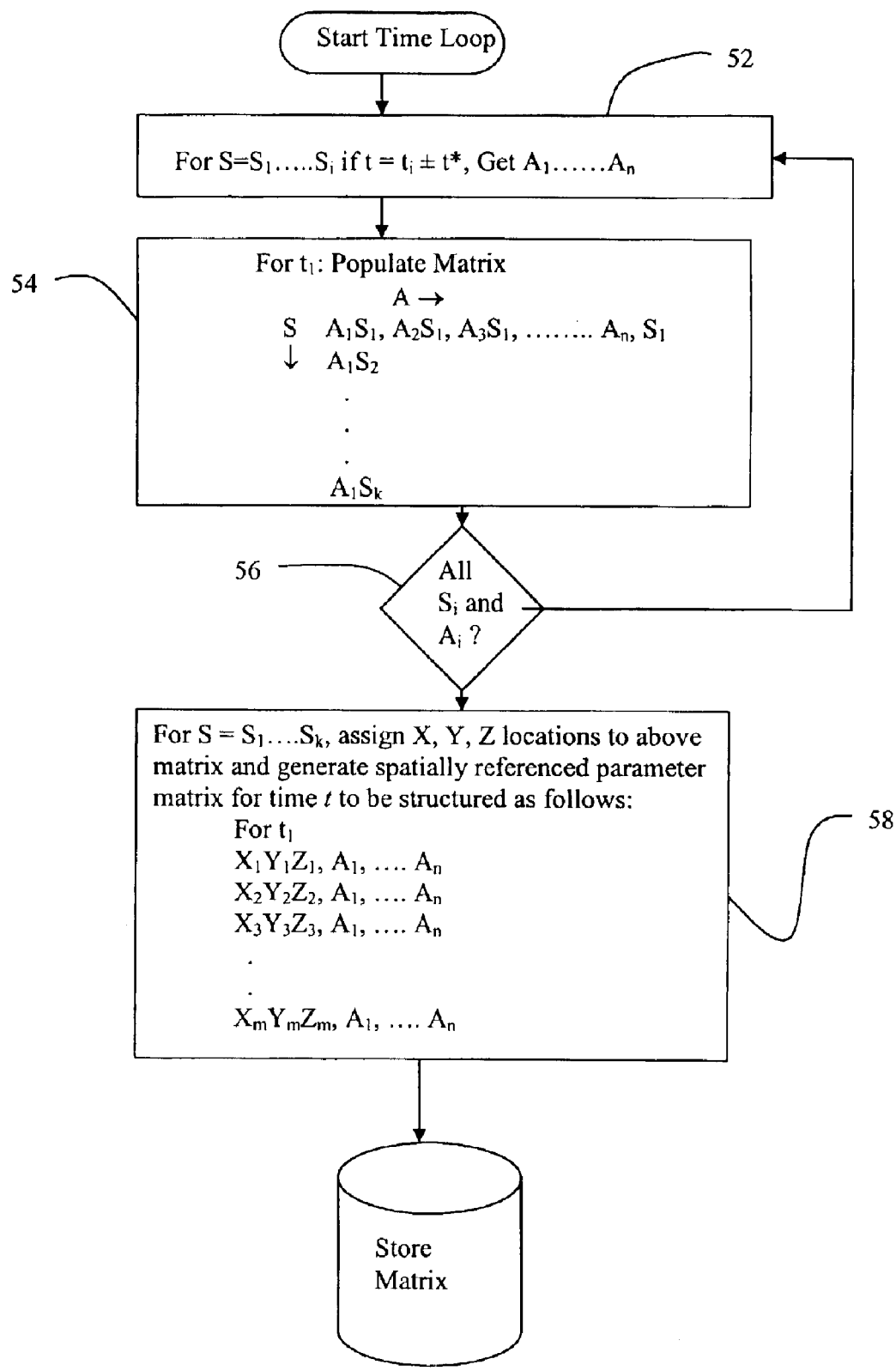
FIG. 4 is a flow diagram of the input engine and matrix generator of the input format software element for an embodiment of the invention.

In operation for an exemplary embodiment, FIG. 4 shows a flowchart including the input processing engine and matrix generator for an exemplary embodiment. For each sensor package location, S, having sensors producing attributes, $A1$–$An$, at each trigger time, t, the IFS input processing engine retrieves data from the sensor package for each attribute, block 52, where the sensor has recorded data within a time interval error around the trigger time. A matrix of sensor position and attribute data is populated, block 54, in a loop, block 56. The populated matrix is then manipulated to create vectors of each attribute type with a spatially referenced parameters $Xi$, $Yi$, and $Zi$ corresponding to each sensor identification, $Si$. For this example, a plot will be created for a location of each sensor with attribute A embedded, then during interpolation, distribution of attribute A is gridded and countoured for a discrete time corresponding to a simultaneous monitoring event.

The GBAS data transfer routine withdraws the sensor data matrices from storage and makes it available to the GIS system for processing and analysis. Timing control for the transfer is determined by the processing options trigger. In various exemplary embodiments, timing triggers are: user defined frequency (e.g., hourly, daily or quarterly); parameter driven frequency (e.g., dissolved oxygen exceeds a predefined threshold); time series plots (e.g., when the parameter values falls outside a predefined range); and automated reporting (e.g., based on required data analysis intervals for regulatory agencies). In an exemplary embodiment, the ESRI Inc. GIS software system, ArcGIS, is employed.

An implementation of the processing options trigger and general GBAS control program generated in Visual Basic is shown in Table 1. A fifteen minute processing interval has been selected as the user defined frequency.

TABLE 1

Main Module with Timing Trigger

```
Sub main( )
'Note: the 1000 represents the total number of loops the GBAS module
will
'do without needing attention from the user, can be set to any
desired value.
For runid = 1 to 1000
    'Timer: this controls the rate at which the GBAS uploads and
    'processes the matrix data, currently set to 15-minutes
    Dim PauseTime, Start, Finish, TotalTime
    PauseTime = 15*60 'Set duration. (15-minutes)
    Start = Timer 'Set start time.
    Do While Timer < Start + PauseTime
        DoEvents 'Yield to other processes.
    Loop
    'Once the timer is satisfied, the GBAS process starts
    Call AddTextFile 'Get the matrix data
    Call AddXYEventLayer 'Make and map the shapefile
    Call IDWmodel 'Generate and map the inferred surface (e.g.,
    inverse-
            'distance-weighting)
    Call RemoveSelectedLayerorTable 'clean up the map and store data
Next runid
End Sub
```

The data transfer routine of the GBAS employed in the exemplary embodiment is shown in Table 2.

TABLE 2

Insert Data Matrices

```
Public Sub AddTextFile( )
    'Get the ITable from the geodatabase
    Dim pFact As IWorkspaceFactory
    Dim pWorkspace As IWorkspace
    Dim pFeatws As IFeatureWorkspace
    Dim pTable As ITable
    Set pFact = New TextFileWorkspaceFactory
    Set pWorkspace = pFact.OpenFromFile("C:\DATA\temp", 0)
    Set pFeatws = pWorkspace
    Set pTable = pFeatws.OpenTable("XYSample.txt")
    'Add the table to the project, by calling the blow Private Sub
    Add_Table_TOC pTable
End Sub
Private Sub Add_Table_TOC(pTable As ITable)
    Dim pDoc As IMxDocument
    Dim pMap As IMap
    Set pDoc = ThisDocument
    Set pMap = pDoc.FocusMap
    ' Create a new standalone table and add it
    ' to the collection of the focus map
    Dim pStTab As IStandaloneTable
    Set pStTab = New StandaloneTable
    Set pStTab.Table = pTable
    Dim pStTabColl As IStandaloneTableCollection
    Set pStTabColl = pMap
    pStTabColl.AddStandaloneTable pStTab
    ' Refresh the TOC
    pDoc.UpdateContents
End Sub
```

Included in the module of Table 2 is a subroutine (Private sub) for adding the created table to the "project" which is the descriptor for the application and sensors employed in the embodiment.

The file generator creates the GIS compatible file for map algebra and layering for presentation. An exemplary generator for a simplified two-dimensional embodiment using a Visual Basic module for creating a shapefile (in the terminology used in the ESRI software) is shown in Table 3. The module in Table 3 is executed from within the ArcGIS environment and employs the ArcGIS spatial analyst extension.

TABLE 3

Create and plot shapefile from data matrix

```
Public Sub AddXYEventLayer( )
    'Dimension variables and define document and map environment
    Dim pDoc As IMxDocument
    Dim pMap As IMap
    Set pDoc = ThisDocument
    Set pMap = pDoc.FocusMap
    'Get the table named XYSample.txt (data table with locations and
parameter value)
    Dim pStTabCol As IStandaloneTableCollection
    Dim pStandaloneTable As IStandaloneTable
    Dim intCount As Integer
    Dim pTable As ITable
    Set pStTabCol = pMap
    For intCount = 0 To pStTabCol.StandaloneTableCount - 1
        Set pStandaloneTable = pStTabCol.StandaloneTable(intCount)
        If pStandaloneTable.Name ="XYSample.txt" Then
            Set pTable = pStandaloneTable.Table
            Exit For
        End If
    Next
    'Get the table name object
    Dim pDataSet As IDataset
    Dim pTableName As IName
    Set pDataSet = pTable
    Set pTableName = pDataSet.FullName
    'Specify the X and Y fields
    Dim pXYEvent2FieldsProperties As IXYEvent2FieldsProperties
    Set pXYEvent2FieldsProperties = New XYEvent2FieldsProperties
    With pXYEvent2FieldsProperties
        .XFieldName = "x"
        .YFieldName = "y"
        .ZFieldName = ""
    End With
    'Specify the data projection (i.e., coordinate system)
    Dim pSpatialReferenceFactory As ISpatialReferenceFactory
    Dim pProjectedCoordinateSystem As IProjectedCoordinateSystem
    Set pSpatialReferenceFactory = New SpatialReferenceEnvironment
    Set pProjectedCoordinateSystem = _
pSpatialReferenceFactory.CreateProjectedCoordinateSystem
(esriSRProjCS_NAD1983UTM_11N)
    'Create the XY name object and set its properties
    Dim pXYEventSourceName As IXYEventSourceName
    Dim pXYName As IName
    Dim pXYEventSource As IXYEventSource
    Set pXYEventSourceName = New XYEventSourceName
    With pXYEventSourceName
        Set .EventProperties = pXYEvent2FieldsProperties
        Set .SpatialReference = pProjectedCoordinateSystem
        Set .EventTableName =
pTableName End With Set pXYName = pXYEventSourceName Set
pXYEventSource = pXYName.Open
    'Create a new Map Layer Dim pFLayer As IFeatureLayer
    Set pFLayer = New FeatureLayer Set pFLayer.FeatureClass =
pXYEventSource
pFLayer.Name = "Sample XY Event layer"
    'Add the layer extension
    Dim pLayerExt As ILayerExtensions Dim pRESPageExt As New
XYDataSourcePageExtension Set pLayerExt = pFLayer
pLayerExt.AddExtension pRESPageExt
    pMap.AddLayer pFLayer pDoc.ActivatedView.PartialRefresh
esriViewGeography, Nothing, Nothing
End Sub
```

The subroutine shown in Table 3 additionally maps the various site points on the display.

In operation with a system according to the present invention, the cartographic layout engine receives the shapefile for each data point matrix to create the inferred continuous surface from the point (i.e., discrete locations) data based on predefined spatial interpretation algorithms. Continuing the exemplary embodiment, the code shown in Table 4 illustrates a Visual Basic module that executed from within ArcGIS to generate a surface based on the inverse distance weighting of the parameter values from the matrix with embedded codes for the data values at the defined time and map coordinates with trend or direction indicators.

TABLE 4

Generate inferred surface based on Inverse-Distance-Weighting

```
Sub IDWmodel( )
    'Define the data field to be used for surface interpolation
    Dim sFieldName As String
    Dim CellSize As Double
    sFieldName = "F4" 'Field name used in interpolation (i.e., data
parameter value)
    CellSize = 100 'Cell size for output raster
    'Dimension variables and define document and map environment
    Dim pMxDoc As IMxDocument
    Dim pMap As IMap
    Set pMxDoc = ThisDocument
    Set pMap = pMxDoc.FocusMap
    'Get feature class from layer
    Dim pFLayer As IFeatureLayer
    Set pFLayer = pMap.Layer(0)
    Dim pFClass As IFeatureClass
    Set pFClass = pFLayer.FeatureClass
    'Create Feature Class Descriptor using a value field
    Dim pFDescr As IFeatureClassDescriptor
    Set pFDescr = New FeatureClassDescriptor
    pFDescr.Create pFClass, Nothing, sFieldName
    'Create Raster Interpolation bject
    Dim pIntOp As IInterpolationOp
    Set pIntOp = New RasterInterpolationOp
    'Set cell size for output raster. The extent of the output raster is
    'defualted to as same as input. The output working directory uses
default
    Dim pEnv As IRasterAnalysisEnvironment
    Set pEnv = pIntOp
    pEnv.SetCellSize esriRasterEnvValue, CellSize
    'Create raster radius using variable distance
    Dim pRadius As IRasterRadius
    Set pRadius = New RasterRadius
    pRadius.SetVariable 12
    'Use FeatureClassDescriptor as an input to the IInterpolationOp and
    'Perform the interpolation
    Dim pOutRaster As IRaster
    Set pOutRaster = pIntOp.IDW(pFDescr, 2, pRadius)
    'Add the result to layer
    Dim pRLayer As IRasterLayer
    Set pRLayer = New RasterLayer
    pRLayer.CreateFromRaster pOutRaster
    pMap.AddLayer pRLayer
End Sub
```

As previously described, various embodiments of a system according to the invention employ alternative means for generating the representative surface, such as kriging.

The overlay generator receives the plots from the layout engine. User defined data overlays are created by the overlay generator to display combined or sequenced data for analysis. Each overlay set is then stored for access by the report generator.

In the exemplary embodiment time sequenced overlays are not created and the GIS display is cleared for display of the next time point using the routine identified in Table 5.

TABLE 5

Remove Selected Layer

```
Public Sub RemoveSelectedLayerorTable( )
'Define the map
    Dim pDoc As IMxDocument
    Dim pMap As IMap
    Set pDoc = ThisDocument
    Set pMap = pDoc.FocusMap
```

TABLE 5-continued

Remove Selected Layer

```
'Remove IDW grid
    Dim pActiveView As IActiveView
    pMap.DeleteLayer pDoc.FocusMap.Layer(0)
    Set pActiveView = pMap
    pActiveView.Refresh
'Remove shapefile
    pMap.DeleteLayer pDoc.FocusMap.Layer(0)
    Set pActiveView = pMap
    pActiveView.Refresh
'Remove a data table
    Dim pStTabCol As IStandaloneTableCollection
    Dim pStandaloneTable As IStandaloneTable
    Dim intCount As Integer
    Dim pTable As ITable
    Set pStTabCol = pMap
    For intCount = 0 To pStTabCol.StandaloneTableCount − 1
        Set pStandaloneTable = pStTabCol.StandaloneTable(intCount)
        If pStandaloneTable.Name = "XYSample.txt" Then
            Set pTable = pStandaloneTable.Table
            Exit For
        End If
    Next
    Dim pSelItem As IUnknown
    Set pSelItem = pStandaloneTable
    Dim pStTab As IStandaloneTable
    Dim pStTabColl As IStandaloneTableCollection
    Set pStTab = pSelItem
    Set pStTabColl = pMap
    pStTabColl.RemoveStandaloneTable pStTab
    'Refresh the TOC
pDoc.UpdateContents
End Sub
```

In a generalized embodiment, the layer data is stored for subsequent retrieval for printing or layer overlay to view multiple sensor outputs simultaneously. Stored data is then retrieved for use by the report generator.

Figure 5:
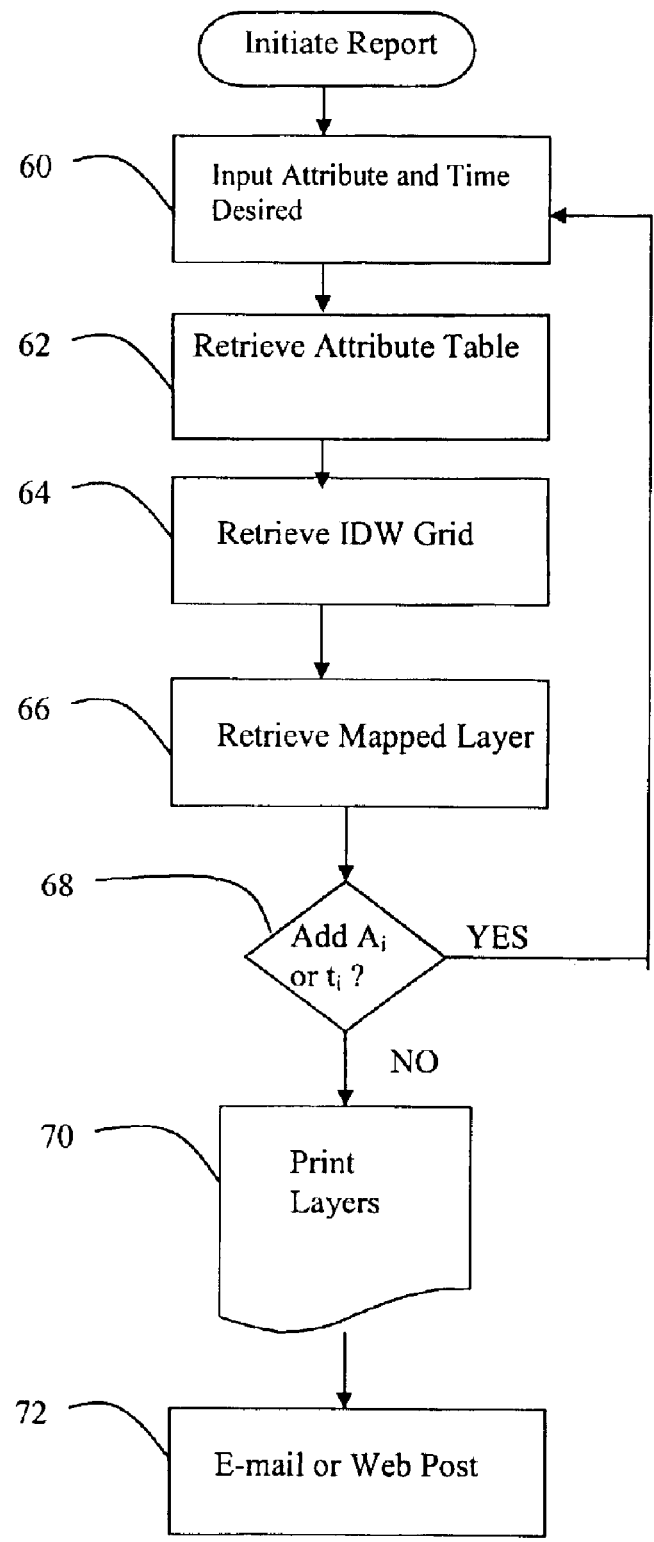
FIG. 5 is a flow diagram of the report generator for an embodiment of the invention.

The report generator incorporates user defined output functionality for the data present in the overlay sets. The report generator is also enabled to provide the defined reports via e-mailed file, alarm trigger, or web site posting. FIG. 5 demonstrates the operation of the report generator. The user manually or automatically selects the attribute and time for report creation, block 60. The attribute matrix data previously stored as a table is retrieved, block 62, the IDW grid for the defined map is retrieved, block 64 and the mapped layer for the attribute is retrieved 66. A loop 68 is performed until all times and/or attributes desired for display on the report are included. The report is then printed, block 70, in hard copy or to a file. The report generator then e-mails or posts the report to a website if configured to do so.

Figure 6:
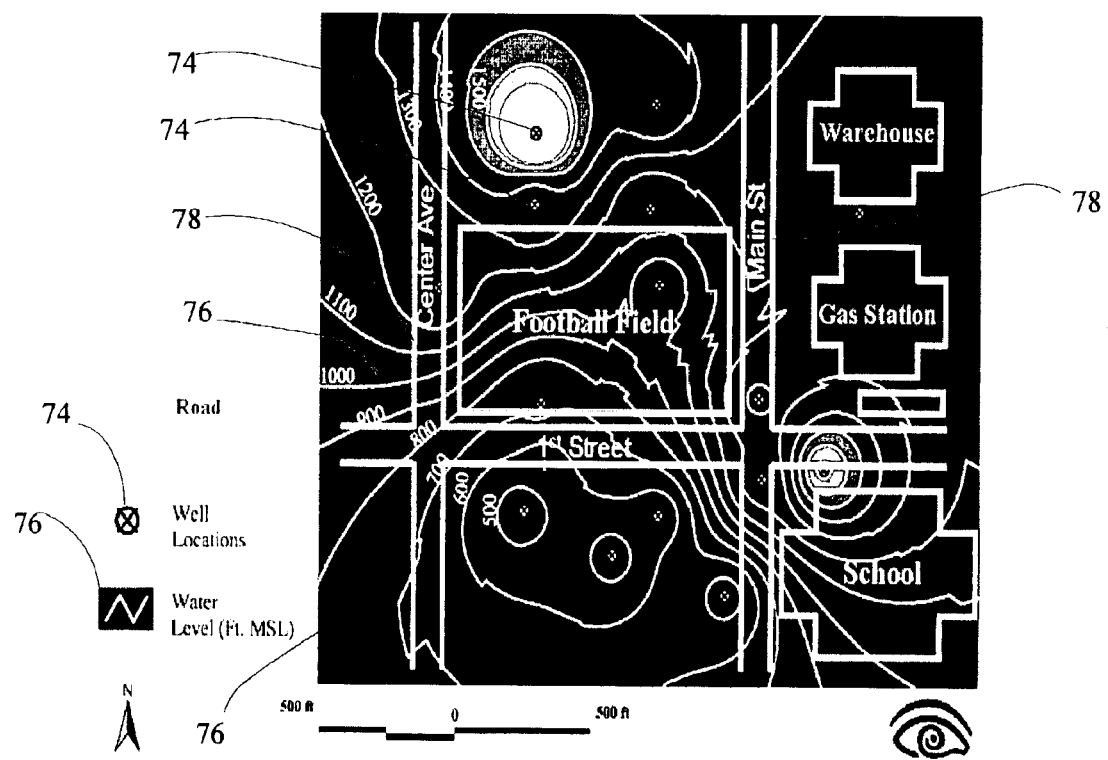
FIG. 6 is an exemplary output from the embodiment of the system.

FIG. 6 shows an exemplary output of the embodiment described herein where a selected attribute is the water level. The sensor package locations, S, are shown graphically as circled X's 74. The water level as determined by the sensor and stored as attribute, A, and is represented by contours 76 created by the layout engine receiving the shapefile. Map features overlayed by the GIS include roads 78 and other geographical features.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A real-time monitoring and reporting system comprising:
   a plurality of sensor packages;
   means for transmitting data from the sensor packages;
   means for receiving the transmitted data;
   a processor having
      means for manipulating data connected to the receiving means, said manipulating means providing real-time data formatted into a cardinal matrix form corresponding to a simultaneous automated monitoring event for the sensor packages,
      means for triggering automated processing of the matrix formatted data,
      means for creating GIS compatible data from the matrix formatted data, and
      means for conducting geostatistical analysis to generate a cartographic layout from the GIS compatible data;
   means for overlaying cartographic layouts as layers for visualizing and display; and
   means for reporting the overlayed cartographic layouts.

2. A real-time monitoring and reporting system as defined in claim 1 wherein each of the plurality of sensor packages has second plurality of sensors each monitoring an attribute.

3. A real-time monitoring and reporting system as defined in claim 2 wherein the means for manipulating data provides a plurality of cardinal matrices equal to and corresponding with the second plurality of attributes corresponding to a simultaneous monitoring event for the attributes.

4. A real-time monitoring and reporting system as defined in claim 1 wherein the means for creating GIS compatible data comprises a means for creating a shapefile.

5. A real-time monitoring and reporting system as defined in claim 1 wherein the reporting means further comprises means for e-mailing the overlayed cartographic layouts.

6. A real-time monitoring and reporting system as defined in claim 1 wherein the reporting means further comprises means for posting the overlayed cartographic layouts to a web site.

7. A real-time monitoring and reporting system as defined in claim 1 further comprising alarm means triggered by said reporting means.

8. A real-time monitoring and reporting system comprising:
   a plurality of sensor packages, each of the plurality of sensor packages having a second plurality of sensors each monitoring an attribute;
   means for transmitting data from the sensor packages;
   means for receiving the transmitted data;
   a processor having
      means for manipulating data connected to the receiving means, said manipulating means providing real time data formatted into plurality of cardinal matrices equal to and corresponding with a simultaneous monitoring event for the second plurality of attributes,
      means for triggering processing of the matrix formatted data,
      means for creating GIS compatible shapefile from the matrix formatted data, and
      means employing real time geostatistical analysis for generating a cartographic layout from the GIS compatible data;
   means for overlaying cartographic layouts as layers for display;
   means for reporting the overlayed cartographic layouts, the reporting means also having means for e-mailing the overlayed cartographic layouts and means for posting the overlayed cartographic layouts to a web site; and
   alarm means triggered by said reporting means.

9. A method for real-time monitoring and reporting of environmental parameters comprising the steps of:
   installing a plurality of sensor packages;
   transmitting data from the sensor packages;
   receiving the transmitted data;
   manipulating the data into a cardinal matrix format corresponding to a simultaneous automated monitoring tin event for the sensor packages;
   triggering processing of the matrix formatted data;
   conducting real time geostatistical analysis on the matrix formatted data;
   creating GIS compatible data from the geostatistical analysis;
   generating a cartographic layout from the GIS compatible data;
   overlaying cartographic layouts as layers for display; and
   reporting the overlayed cartographic layouts.

10. A method for real-time monitoring and reporting of environmental parameters as defined in claim 9 wherein the step of installing a plurality of sensor packages includes installing a second plurality of sensors in each package, each monitoring an attribute.

11. A method for real-time monitoring and reporting of environmental parameters as defined in claim 10 wherein manipulating data provides a plurality of cardinal matrices equal to and corresponding with the second plurality of attributes corresponding to a simultaneous monitoring event for the attributes.

12. A method for real-time monitoring and reporting of environmental parameters as defined in claim 9 wherein the step of creating GIS compatible data comprises creating a shapefile.

13. A method for real-time monitoring and reporting of environmental parameters as defined in claim 9 wherein the step of reporting further comprises the step of e-mailing the overlayed cartographic layouts.

14. A method for real-time monitoring and reporting of environmental parameters as defined in claim 9 wherein the step of reporting further comprises the step of posting the overlayed cartographic layouts to a web site.

15. A method for real-time monitoring and reporting of environmental parameters as defined in claim 9 further comprising the step of activating an alarm upon occurrence of a predetermined status of the data attributes.

16. A method for real-time monitoring and reporting of environmental parameters as defined in claim 9 wherein the step of generating a cartographic layout from the GIS compatible data comprises generating an inferred surface based on inverse-distance-weighting.

17. A method for real-time monitoring and reporting of environmental parameters as defined in claim 9 wherein the step of generating a cartographic layout from the GIS compatible data comprises kriging to generate the inferred surface.

18. A method for real-time monitoring and reporting of environmental parameters comprising the steps of:
   installing a plurality of sensor packages and installing a second plurality of sensors in each package, each monitoring an attribute;
   transmitting data from the sensor packages;
   receiving the transmitted data;

manipulating the data into a plurality of cardinal matrices equal to and corresponding with a simultaneous monitoring event for the second plurality of attributes;

triggering processing of the matrix formatted data;

creating a shapefile for each attribute from the matrix formatted data;

conducting real time geostatistical analysis to generate a cartographic layout from the GIS compatible data;

overlaying cartographic layouts as layers for display; and reporting the overlayed cartographic layouts.

19. A method for real-time monitoring and reporting of environmental parameters as defined in claim 18 wherein the step of conducting real time geostatistical analysis comprises generating an inferred surface based on inverse-distance-weighting.

20. A method for real-time monitoring and reporting of environmental parameters as defined in claim 18 wherein the step of conducting real time geostatistical analysis comprises kriging to generate an inferred surface.

* * * * *